(12) United States Patent
Breeden

(10) Patent No.: US 7,874,047 B2
(45) Date of Patent: Jan. 25, 2011

(54) RETRACTABLE SELF-CONTAINED TIE-DOWN

(76) Inventor: Winston Breeden, 71 S. Franklin, Chagrin Falls, OH (US) 44022

( * ) Notice: Subject to any disclaimer, the term of this patent is extended or adjusted under 35 U.S.C. 154(b) by 691 days.

(21) Appl. No.: 11/560,036

(22) Filed: Nov. 15, 2006

(65) Prior Publication Data

US 2007/0189873 A1    Aug. 16, 2007

Related U.S. Application Data

(60) Provisional application No. 60/736,909, filed on Nov. 15, 2005.

(51) Int. Cl.
B25B 25/00    (2006.01)

(52) U.S. Cl. .................................. 24/68 CD

(58) Field of Classification Search ............. 24/68 CD, 24/68 R; 254/218, 223, 247, 217, 222; 410/100
See application file for complete search history.

(56) References Cited

U.S. PATENT DOCUMENTS

| | | | |
|---|---|---|---|
| 2,156,062 A | 4/1939 | Porter |
| 2,946,563 A | 7/1960 | Eaton |
| 2,991,975 A | 7/1961 | Alexander |
| 2,993,680 A | 7/1961 | Davis |
| 3,175,806 A | 3/1965 | Prete, Jr. |
| 3,180,623 A | 4/1965 | Huber |
| 3,279,760 A | 10/1966 | Bathum, Jr. |
| 4,227,286 A | 10/1980 | Holmberg |
| 4,542,883 A | 9/1985 | Rutzki |
| 4,622,721 A | 11/1986 | Smetz et al. |
| 4,823,443 A | 4/1989 | Waters |
| 4,830,340 A | 5/1989 | Knitig |
| 4,842,458 A | 6/1989 | Carpenter |
| 5,271,606 A | 12/1993 | Kamper |
| 5,282,706 A | 2/1994 | Anthony et al. |

(Continued)

FOREIGN PATENT DOCUMENTS

DE    27 17 157    9/1978

(Continued)

OTHER PUBLICATIONS

International Search Report dated Jul. 25, 2007 in reference to international application No. PCT/US06/44405.

(Continued)

Primary Examiner—James R Brittain
(74) Attorney, Agent, or Firm—Pearne & Gordon LLP

(57) ABSTRACT

A ratcheting tie-down device is provided that includes a main body portion, a hub rotatable relative to the main body portion about an axis, a webbing windable about the hub, and means for attaching at least one end of the webbing to an object. The device further includes means for biasing winding of webbing, a ratchet wheel having a plurality of ratchet teeth, a lock member resiliently biased into locking engagement with at least one ratchet tooth to inhibit unwinding of the webbing about the hub, and a lever arm rotatable about the axis for moving the ratchet wheel and wind the webbing. In one example, the device a rotational support element is provided to maintain orientation of the hub such that it can freely rotate. In another example, means for braking is provided to inhibit winding of at least some portion of the webbing about the hub.

28 Claims, 11 Drawing Sheets

U.S. PATENT DOCUMENTS

| | | | |
|---|---|---|---|
| 5,423,644 | A | 6/1995 | First, Sr. |
| 5,443,342 | A | 8/1995 | Huang |
| 5,542,798 | A | 8/1996 | Rawdon et al. |
| 5,560,086 | A | 10/1996 | Huang |
| 5,611,520 | A | 3/1997 | Soderstrom |
| 5,746,192 | A | 5/1998 | Gissel |
| 6,007,053 | A | 12/1999 | Huang |
| 6,102,371 | A | 8/2000 | Wyers |
| 6,195,848 | B1 | 3/2001 | Jackson et al. |
| 6,547,218 | B2 | 4/2003 | Landy |
| 6,609,275 | B1 | 8/2003 | Lin |
| 6,641,116 | B1 | 11/2003 | Huang |
| 7,350,767 | B2 | 4/2008 | Huang |
| 2006/0197071 | A1 | 9/2006 | Huang |

FOREIGN PATENT DOCUMENTS

| | | |
|---|---|---|
| EP | 0 580 392 A1 | 1/1994 |
| GB | 2 002 315 A | 2/1979 |

OTHER PUBLICATIONS

Supplementary European Search Report dated May 7, 2009.

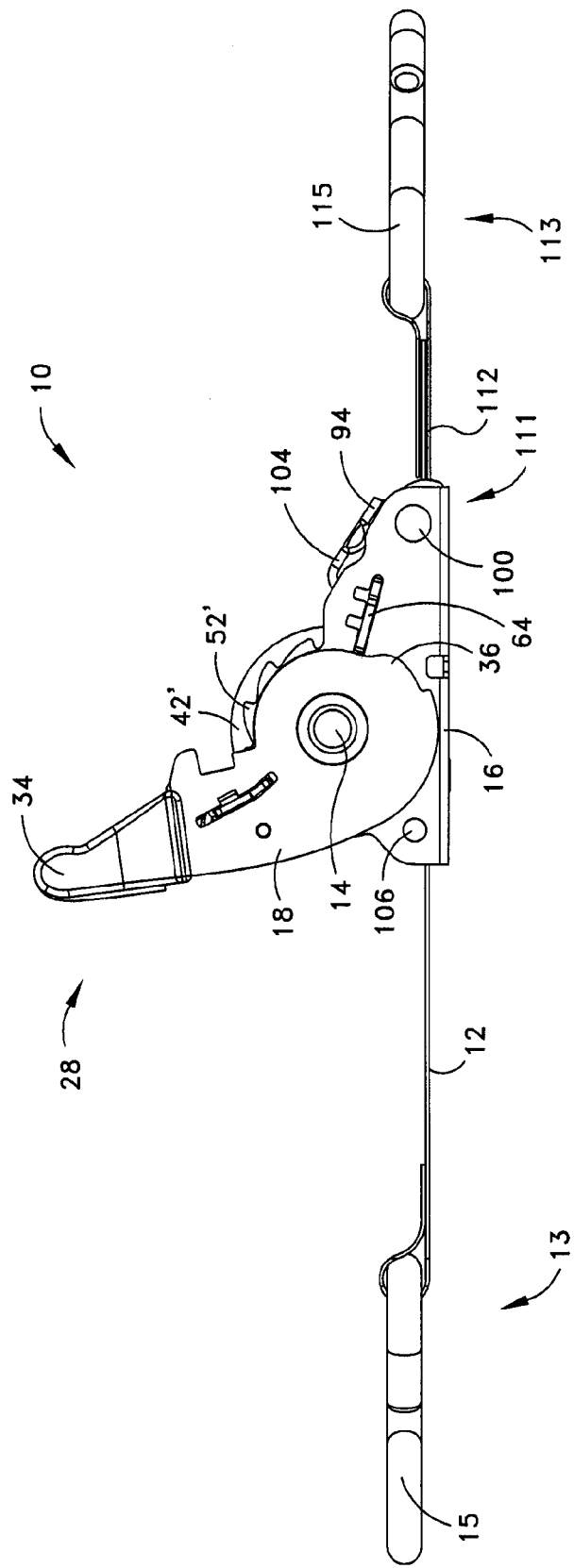

RETRACTABLE SELF-CONTAINED TIE-DOWN

RELATED APPLICATIONS

This application claims the benefit of U.S. Provisional Application No. 60/736,909, filed on Nov. 15, 2005, the entire disclosure of which is hereby incorporated herein by reference.

FIELD OF THE INVENTION

The present invention relates generally to a ratcheting tie-down for attachment to an object.

BACKGROUND OF THE INVENTION

A ratcheting tie-down device can be used to secure a wide variety of objects to various support surfaces and/or to various other objects. Conventionally, a ratcheting tie-down device has a webbing with at least one extendable end. This end of the webbing is attached to an object or a surface, and a ratcheting mechanism is utilized to tighten the webbing to remove any slack to ensure that the object is securely retained. However, several problems can occur. In one example, conventional tie-down devices feature a webbing that is completely detachable from the ratcheting mechanism. As such, the user is required to feed the webbing into the ratcheting mechanism prior to every use, and to release and remove the webbing therefrom after every use. Such a large amount of loose webbing can be unwieldy, become tangled, and/or be difficult to store. In another example, during attachment of the ends of the webbing to the objects and/or surfaces, slack in the webbing of a conventional tie-down device can permit the attached ends of the webbing to fall off or dislodge from the object and/or surface before the webbing is tightened. Accordingly, it would be beneficial to provide an automatically retractable tie-down device that can overcome the aforementioned problems.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the present invention, a ratcheting tie-down device is provided. The ratcheting tie-down device includes a main body portion, a reel for rotation relative to the main body portion about an axis, and a webbing for winding about the reel. The ratcheting tie-down device further includes means for attaching at least one end of the webbing to an object, and means for ratcheting rotation of the reel to wind the webbing onto the reel. The means for ratcheting has an operational condition in which ratcheting rotation can occur and a non-operational condition in which ratcheting rotation cannot occur. The ratcheting tie-down device further includes means for biasing the reel to wind the webbing onto the reel when the means for ratcheting is in the non-operational condition. The means for biasing includes a spring that extends about the axis.

In accordance with another aspect of the present invention, a ratcheting tie-down device is provided. The ratcheting tie-down device includes a main body portion, a hub rotatable relative to the main body portion about an axis, a webbing windable about the hub, and means for attaching at least one end of the webbing to an object. The ratcheting tie-down device further includes means for biasing winding of webbing, and a ratchet wheel having a plurality of ratchet teeth. The ratchet wheel is rotatable relative to the main body portion about the axis. The ratcheting tie-down device further includes a lever arm rotatable relative to the main body portion about the axis between a first position and a second position.

In accordance with another aspect of the present invention, a ratcheting tie-down device is provided. The ratcheting tie-down device includes a main body portion, a hub rotatable relative to the main body portion, a webbing for winding about the hub, and means for attaching at least one end of the webbing to an object. The ratcheting tie-down device further includes means for biasing the reel to wind the webbing about the hub and a lever arm rotatable relative to the main body portion. The lever is rotatable about a first axis and the hub being rotatable about a second axis. The ratcheting tie-down device further includes a rotational support element having a hole extending therethrough, the hub extending through the hole. The rotational support element is adapted to maintain the first axis generally coaxial with the second axis.

In accordance with yet another aspect of the present invention, a ratcheting tie-down device is provided. The ratcheting tie-down device includes a main body portion, a hub that is rotatable relative to the main body portion about an axis, a webbing for winding about the hub, and means for attaching at least one end of the webbing to an object. The ratcheting tie-down device further includes means for biasing the hub to wind the webbing about the hub, means for braking being adapted to inhibit winding of at least some portion of the webbing about the hub, and means for releasing being adapted to selectively release the means for braking to thereby permit the means for biasing to wind the webbing about the hub.

In accordance with yet another aspect of the present invention, a ratcheting tie-down device is provided. The ratcheting tie-down device includes a main body portion, a hub rotatable relative to the main body portion about an axis, a webbing for winding about the hub, means for attaching at least one end of the webbing to an object, and means for biasing the reel to wind the webbing about the hub. The ratcheting tie-down device further includes a lever arm rotatable about the axis and operable to cause winding, means for preventing webbing withdrawal, means to disable the means for preventing such that the hub may freely rotate, and a bushing adapted to maintain orientation of the hub such that the ability to freely rotate is maintained.

In accordance with still yet another aspect of the present invention, a ratcheting tie-down device is provided. The ratcheting tie-down device includes a main body portion, a hub rotatable relative to the main body portion about an axis, a webbing for winding about the hub, and means for attaching at least one end of the webbing to an object. The ratcheting tie-down device further includes a lever arm rotatable about the axis and operable to cause winding, means for preventing webbing withdrawal, means to disable the means for preventing such that the hub may freely rotate, and means for biasing the reel to wind the webbing about the hub. The means for biasing maintains a tensioning force on the webbing while at least a portion of the webbing is withdrawn.

In accordance with still yet another aspect of the present invention, a ratcheting tie-down device is provided. The ratcheting tie-down device includes a main body portion, a hub rotatable relative to the main body portion about an axis, a webbing windable about the hub, and means for attaching at least one end of the webbing to an object. The ratcheting tie-down device further includes means for biasing winding of webbing and a ratchet wheel having a plurality of ratchet teeth. The ratchet wheel is rotatable relative to the main body portion about the axis. The ratcheting tie-down device further includes a lock member that is resiliently biased into locking engagement with at least one ratchet tooth of the plurality of ratchet teeth to inhibit unwinding of the webbing about the hub, and a lever arm movable between a first position and a second position to move the ratchet wheel and wind the webbing. The lever arm is movable to a third position to disengage the lock member from the at least one ratchet tool to permit unwinding of the webbing about the hub.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 6B is similar to FIG. 6A, but shows the lever arm in an example second position;

DESCRIPTION OF EXAMPLE EMBODIMENTS

Figure 1:
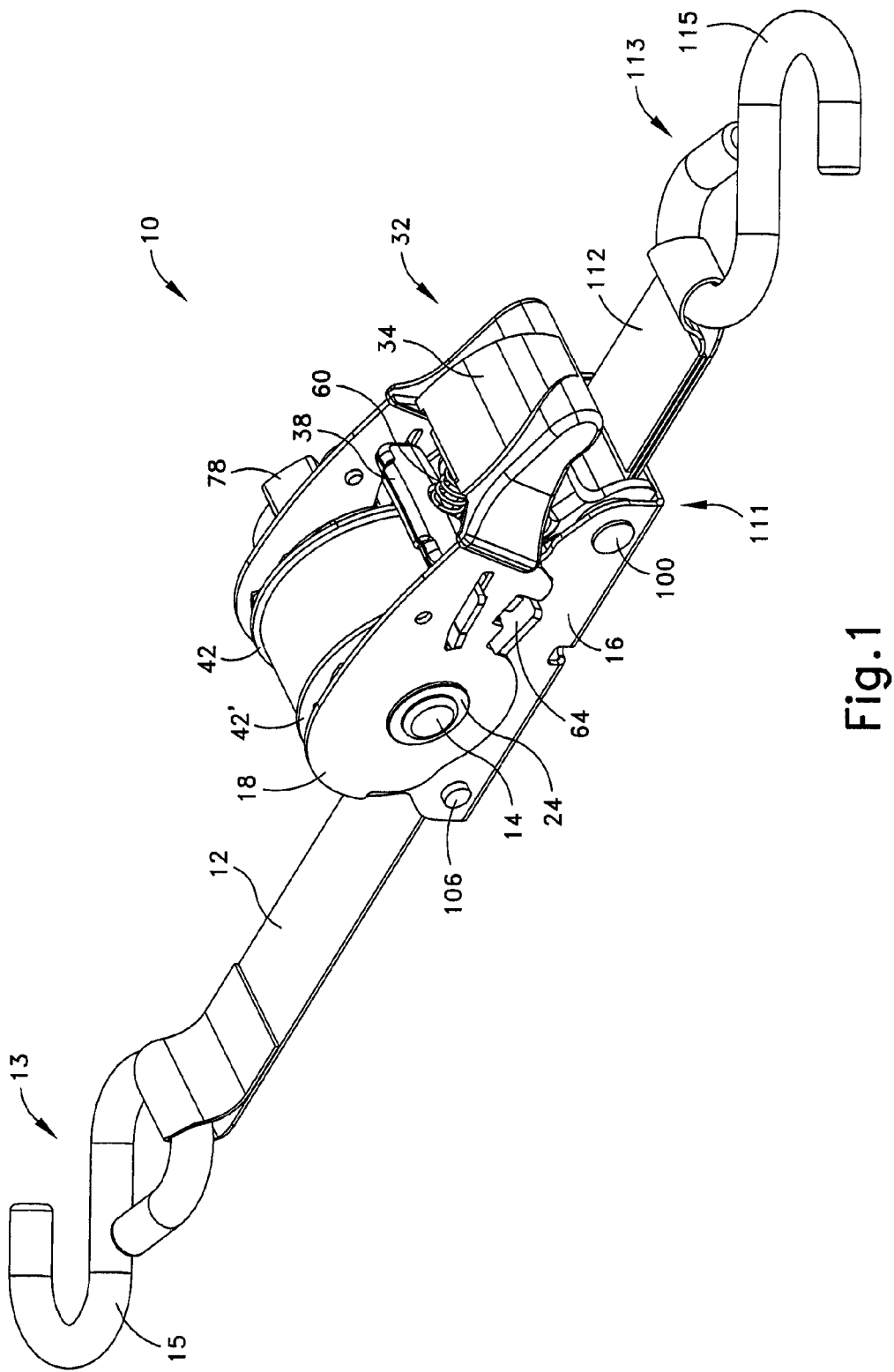
FIG. 1 is a perspective view of an example ratcheting tie-down device in accordance with an aspect of the present invention.

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Turning to the shown example of FIG. 1, an example ratcheting tie-down device 10 is provided. The tie-down device 10 is shown generally in a storage position such that a length of webbing 12 is wound substantially completely about a hub 14 (see FIG. 2), though it is to be appreciated that a portion of the webbing 12 can still extend a distance from the tie-down device 10.

Figure 2:
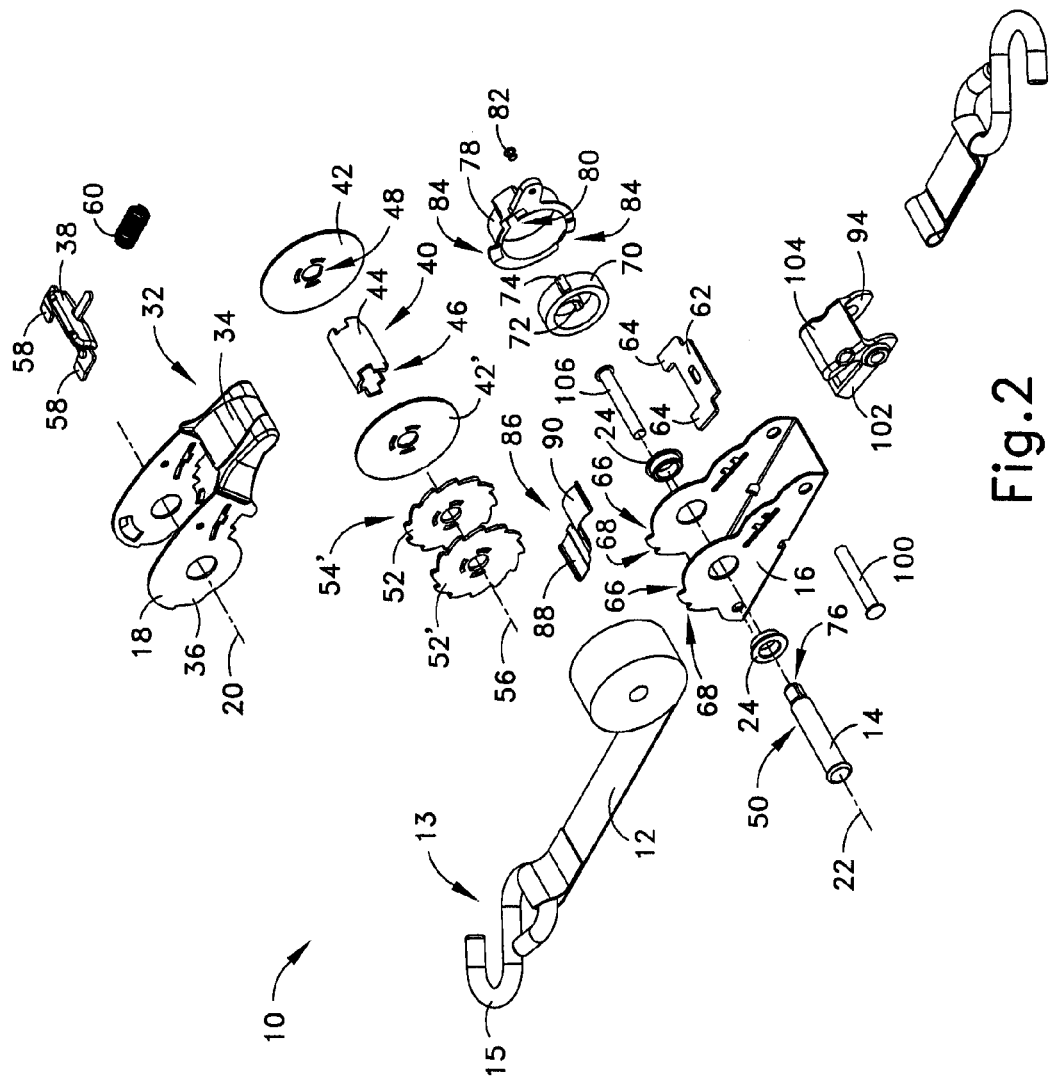
FIG. 2 is similar to FIG. 1, but shows an exploded view of the ratcheting tie-down device.

As shown in FIGS. 1-2, the example ratcheting tie-down device 10 includes a main body portion 16. The main body portion 16 can provide a centralized component for mounting the various elements of the tie-down device 10 thereto. The main body portion 16 can include a generally rigid material, such as metal, plastic, or the like, and can be formed in various manners. As shown, the main body portion 16 can include a metal material, such as steel or brass, which can be formed using various hot or cold-working processes, such as stamping, bending, drilling, or the like. In addition or alternatively, the main body portion 16 can also be formed from a molding process, or can even be formed from a plurality of elements that can be attached together in various manners, such as through fasteners, adhesives, welding, or the like.

Figure 6A:
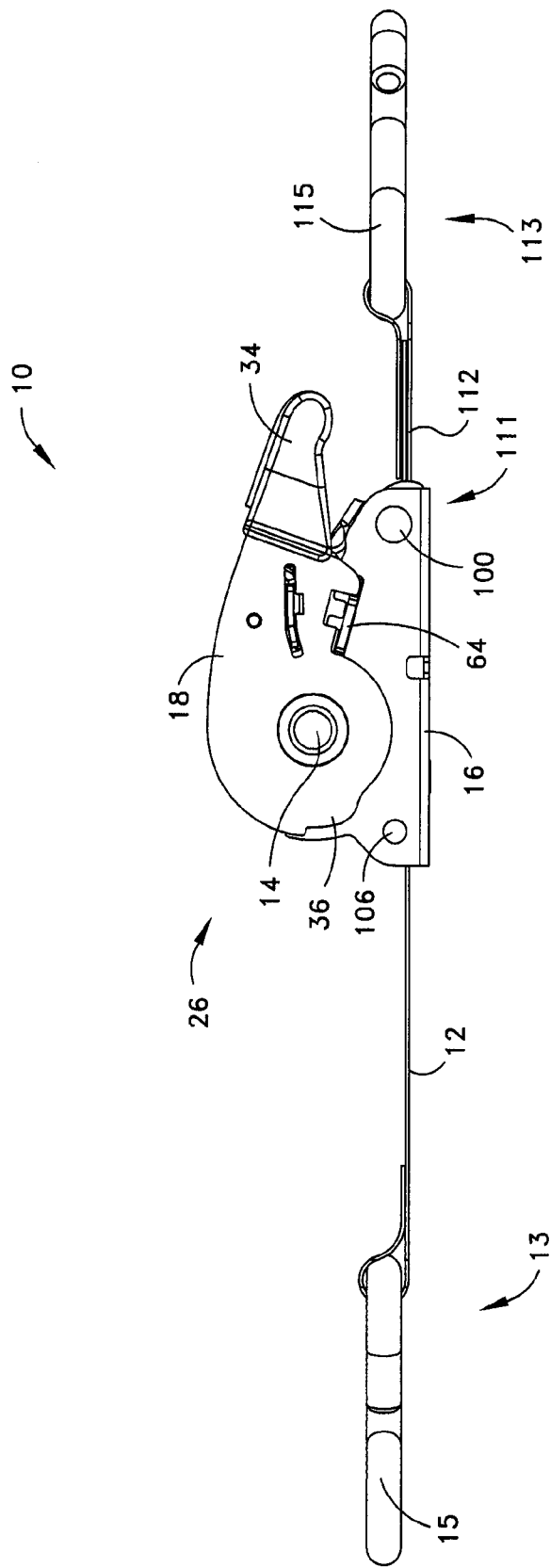
FIG. 6A is a side view of the ratcheting tie-down device showing an example lever arm in an example first position.
Figure 6C:
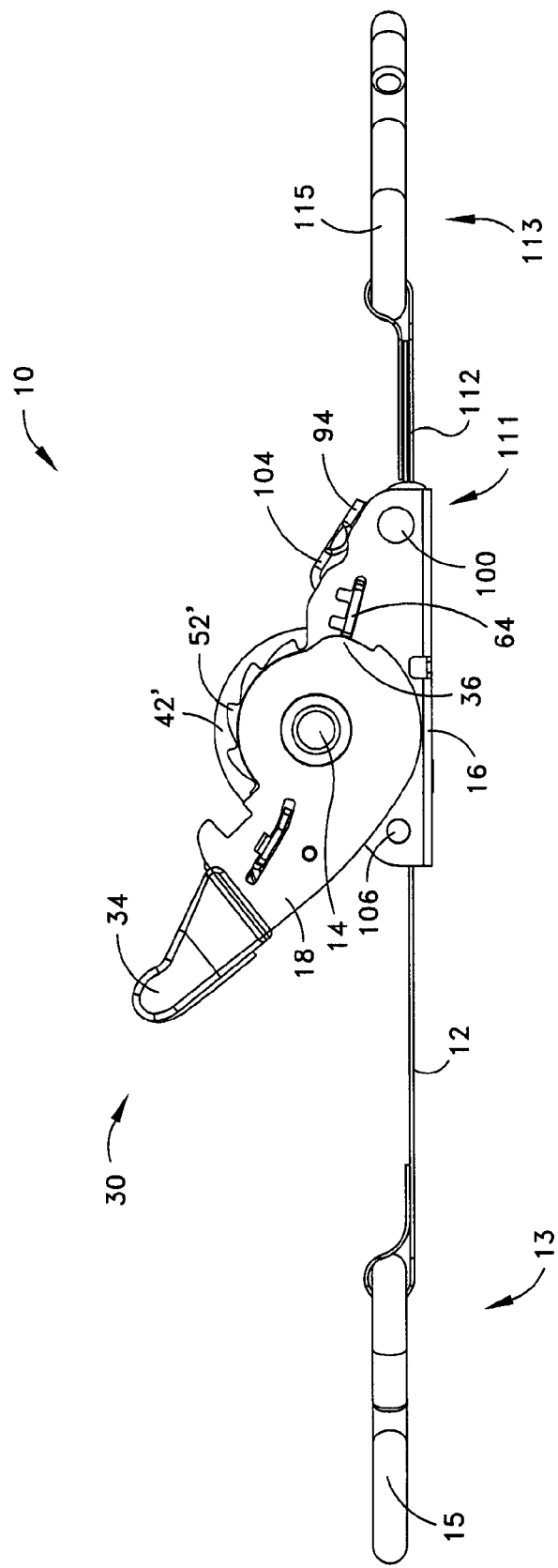
FIG. 6C is similar to FIG. 6A, but shows the lever arm in an example third position.

The ratcheting tie-down device 10 can also include means for ratcheting rotation of the hub 14 to wind the webbing 12 onto the hub 14. The means for ratcheting can include various elements, such as a lever arm 18 rotatably (i.e., rotatable through an arc to pivot) attached to the main body portion 16. For example, as shown, the lever arm 18 can be rotatably attached to the main body portion 16 through the hub 14, and can be rotatable relative to the main body portion 16 about a first axis 20 (e.g., a rotational axis). Additionally, the hub 14 can rotate about a second axis 22 (e.g., a rotational axis) independently of the main body portion 16 and the lever arm 18 through a pair of bushings 24 disposed therebetween. As such, each bushing is an example of a rotational support element, although it is to be appreciated that other structures, such as bearings or the like, can also be used to provide rotational support. For example, the main body portion 16 and the lever arm 18 can rotate about an external periphery of the bushing 24, while the hub 14 rotates about an internal periphery of the bushing 24. The lever arm 18 can be rotatable between various positions, as shown in FIGS. 6A-6C, such as a first position 26, second position 28, and/or even a third position 30, though other positions are contemplated.

Focusing upon the bushings 24, it is to be appreciated that in one embodiment the bushings are made of metal or other fairly durable material. In one example, each bushing 24 has at least one function of retaining the hub 14 at a proper orientation (e.g., axially aligned) relative to the main body portion 16 and/or the lever arm 18. So the bushing 24, which is a rotational support element, is adapted to maintain one pivot axis (e.g., the first) generally coaxial with another pivot axis (e.g., the second). This particular function is useful when the ratcheting tie-down device 10 is used to apply a tensile load via the webbing 12. The webbing may impart force to the hub 14 that would tend to urge the hub out of coaxial alignment. In one example, the lack of coaxial alignment or misalignment may take the form of axial skewing. In general, one of the aforementioned axes would not be generally aligned with another of the axes. Such axial misalignment may prevent proper operation of the ratcheting tie-down device 10. For example, axial misalignment may create friction that can inhibit or prevent a means for biasing 70 from retracting the webbing 12. Further discussion of the benefits of maintaining coaxial alignment is provided below.

The lever arm 18 can further include various other features. For example, the lever arm 18 can include a handle portion 32 that can have a grip surface to facilitate movement of the lever arm 18 among the various positions 26-30. The grip surface of the handle portion 32 can include various surface features to facilitate a user's hand grip, such as various recesses or projections. In addition or alternatively, as shown in the various figures, the handle portion 32 can include a grip surface 34 formed of a plastic, rubber, or the like that has been fixedly or removably attached to the handle portion 32 by way of fasteners, adhesives, welding, molding, or the like. The grip surface 34 can include various recesses or projections, and/or can even include various indicia, instructions, logos, etc. In addition or alternatively, the lever arm 18 can also include one or more cams 36 located about a peripheral edge of the lever arm 18, and/or a rotational lock element 38, each of which will be discussed more fully herein. Further still, the lever arm 18 can be formed in various manners using various materials, similar to those manners and materials discussed previously herein regarding the main body portion 16.

As stated previously, the ratcheting tie-down device 10 can further include the webbing 12 for winding about the hub 14 (i.e., the wraps of the webbing go around the hub). The webbing 12 can also be extended a selected distance from the tie-down device 10 as needed for attachment to various objects, support surfaces, etc. The webbing 12 can include a strap or the like that can include various materials having a sufficient strength for securing various objects, such as a nylon webbing or the like. Additionally, the strap can have various lengths, such as 5 feet, 10 feet, or 20 feet, though various other distances are also contemplated to be within the scope of this disclosure. The webbing 12 can be non-disjoint and formed from a uniform piece of material, or it can also include various sections joined together in various manners. Further, the webbing 12 can include two ends, one end 13 being extendable from main body portion 16, and the other being attachable to the hub 14.

Additionally, the extendable end 13 of the webbing 12 can also include means for attaching 15 the end 13 to an object, supporting surface, etc. (see FIG. 8). In one example, the means for attaching 15 can include a hook, though various other coupling elements can also be used, such as straps, loops, clips, magnets, hitches, or the like. The means for attaching 15 can be either removably or non-removably connected to the webbing 12 in various manners. For example, the hook can include an eye through which a portion of the webbing 12 can be received. The webbing 12 can then be folded over on itself and attached to another portion of the webbing in various manners, such as by adhesives, stitching, welding, or the like.

Keeping with FIGS. 1 and 2, the ratcheting tie-down device 10 can further include a reel 40 disposed within an interior area of the main body portion 16. The reel 40 can include a single body, or it can be formed of multiple pieces, such as a pair of side elements 42, 42'. As used herein, similar or identical structure is noted with a prime designation (e.g., "'"). Thus, the two side elements 42, 42' can be substantially similar, as shown, though they can also each include specific features. The two side elements 42, 42' can be attached using various methods, such as adhesives, welding, snap fittings, fasteners, or the like. In the shown example, the two side elements 42, 42' can be attached through a central fastener 44 having one or more arms extending therefrom for receipt into holes formed through each of the side elements 42, 42'. Thus, the side elements 42, 42' can each rotate together with the central fastener 44. As shown, the central fastener 44 can include a generally cylindrical geometry having an inner diameter generally equal to or greater than the outer diameter of the hub 14 to facilitate assembly of the reel 40.

Additionally, the reel 40 can include the hub 14 for winding the tie-down webbing 12 thereon, though it is to be appreciated that the hub 14 could also be provided as a separate element. Within the shown example, the central fastener 44 of the reel 40 is hollow so that the hub 14 extends therethrough. So when the webbing is wound onto the reel 40, the webbing is also wound about the hub 14. It is to be appreciated that the tie-down webbing 12 can be wound about the reel 40 and hub 14 in various manners. In one example, as shown, the tie-down webbing 12 can be wound on the reel 40 and about the hub 14 so that it progressively wraps about itself to form a spiral roll. With regard to specific structures, it is to be appreciated that the shown embodiments are only examples and that various different structures are possible. So, the hub 14 can have a generally tubular geometry to permit the webbing 12 to wind thereon when the reel 40 is rotated. Alternatively, the hub 14 can be contained within a hollow interior of the central fastener 44, and the webbing 12 can wind about the central fastener 44. Thus, as shown in FIG. 2, the central fastener 44 can include an aperture 46 extending therethrough. The aperture 46 can extend along a portion of the longitudinal extent of the central fastener 44, or as shown, can even extend across the entire longitudinal extent thereof. The aperture 46 can have a geometry similar to that of the webbing 12 to permit the webbing 12 to extend completely through the aperture 46.

As such, one end of the webbing 12 can be non-removably attached to the hub 14. For example, even when the webbing 12 is completely extended from the ratcheting tie-down device 10, the webbing 12 can remain attached to the tie-down device 10. Thus, in such a self-contained device, a user would not be required to feed the webbing 12 into the ratcheting mechanism prior to every use, or to release and remove the webbing 12 therefrom after every use. The webbing 12 can be non-removably attached to the hub 14 in various manners. For example, webbing 12 can then be folded over on itself and attached to another portion of the webbing in various manners, such as by adhesives, stitching, welding, or the like. The folded-over webbing 12 can form a non-removable loop around the hub 14. In another example, the hub 14 can be configured to grasp, such as through a clamp, teeth, or the like (not shown) a portion of the end of the webbing 12.

Figure 3:
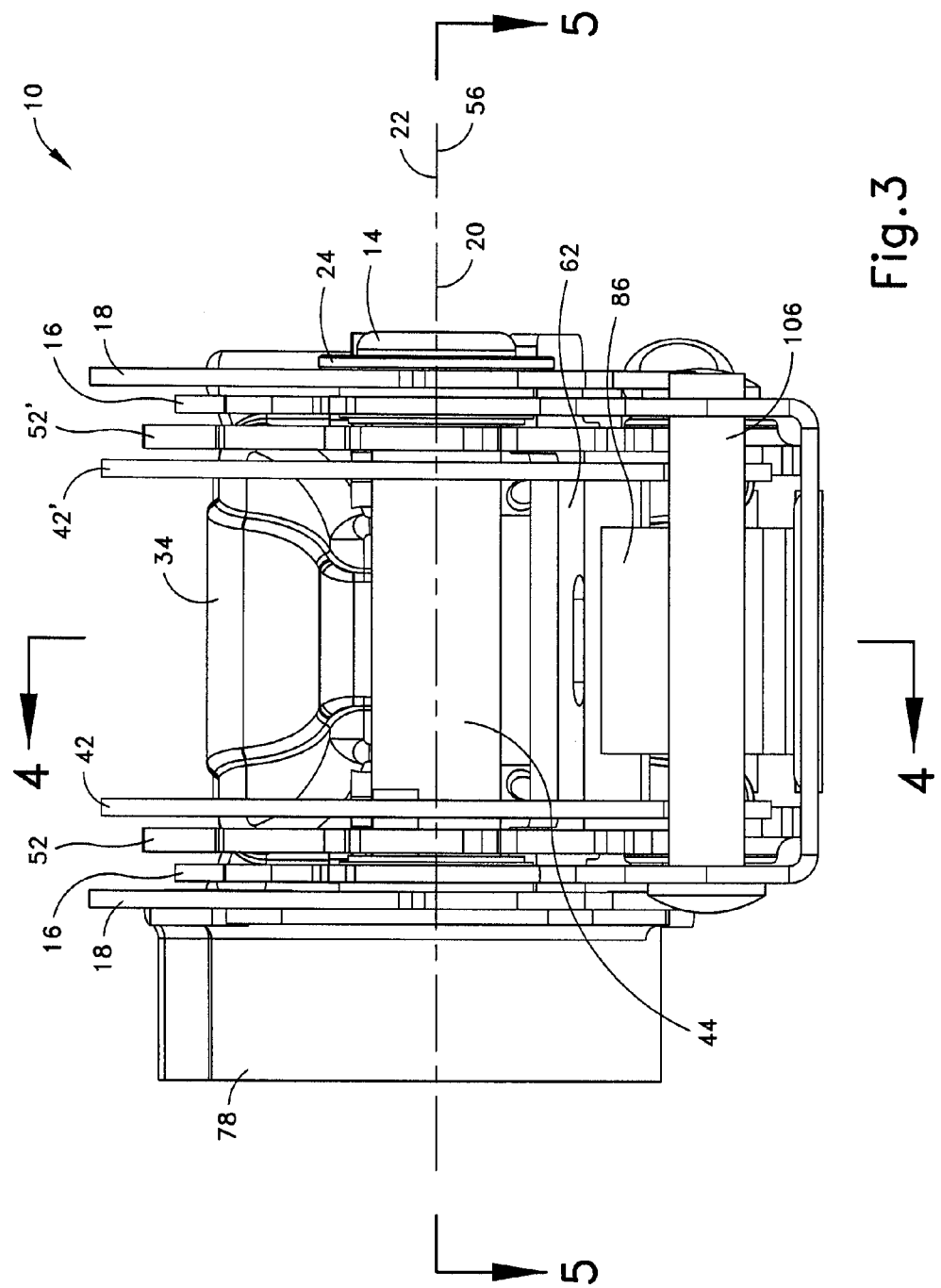
FIG. 3 is a rear view of the ratcheting tie-down device of FIG. 1 with the webbing not shown for clarity.

The reel 40 can also include additional features. For example, the pair of side elements 42, 42' can act as sidewalls configured to retain the tie-down webbing 12 as it is wound about the hub 14 and/or central fastener 44. For example, as shown in FIG. 3, the sidewalls can be spaced a distance apart from each other (e.g., separated by the central fastener 44) to provide proper alignment of the webbing 12 relative to the main body portion 16 to thereby facilitate generally consistent winding and unwinding of the webbing 12 relative to the reel 40. In addition or alternatively, one or both of the side elements 42, 42' can include a keyway 48 for interaction with a corresponding keying portion 50 of the hub 14. For example, as shown in FIG. 2, one of the side elements 42 can include a non-circular keyway 48 (e.g., a circular hold with a flattened portion) for locking engagement with a correspondingly shaped key 50 (e.g., a flattened portion on the otherwise generally cylindrical hub 14). Thus, rotational force from the hub 14 is thereby transmitted to the various elements of the reel 40 through the locking engagement of the keyway 48 and key 50.

The ratcheting tie-down device 10 can further include various elements for winding the webbing 12 about the hub 14. In one example, the ratcheting tie-down device 10 can include a ratchet wheel 52 or the like having a plurality of ratchet teeth 54. As shown in FIG. 2, the tie-down device 10 can include a pair of ratchet wheels 52, 52' each having a plurality of teeth 54, 54', though various numbers of ratchet wheels are contemplated. As before, similar or identical structure is noted with a prime designation (e.g., "'"). Further still, either or both of the ratchet wheels 52, 52' can include recesses or holes to receive the one or more arms extending from the central fastener 44. Thus, the ratchet wheels 52, 52' can each rotate together with the central fastener 44. Additionally, as shown in FIG. 3, each ratchet wheel can be located between an associated side element 42, 42' and the main body portion 16, though other placements are also contemplated. Still further, the ratchet wheels, or more specifically the ratchet teeth, can be combined into the reel.

The ratchet wheels 52, 52' are rotatable relative to the main body portion 16 about a third axis 56 (e.g., a rotational axis). Because the ratchet wheels 52, 52' can rotate together with the central fastener 44, and because the side elements 42, 42' can also rotate together with the central fastener 44, the second and third axes 22, 56 are intended to be coaxial. Additionally, because the hub 14 rotates together with the side elements 42, 42' through the keyway 48 and key 50, the first and second axes 20, 22 are intended to be coaxial. Thus, the first, second, and third axes 20, 22, 56 are intended to be coaxial. Indeed, as shown in FIG. 3, the first, second, and third axes 20, 22, 56 can be coaxial with the rotational axis of the hub 14 such that rotation occurs about that single rotational axis. In reality, it is to be appreciated that the first, second, and third axes 20, 22, 56 can be geometrically coaxial, or alternatively, the axes 20, 22, 56 can also be slightly misaligned due to various considerations, such as manufacturing tolerances, wear, age, etc. However, for ease of discussion, the three axes can be referred to as a single axis with the understanding such possible slight misalignment may be present. Also, rotation of any of the hub 14, side elements 42, 42' and/or ratchet wheels 52, 52' can cause corresponding rotation of the other components.

Figure 4:
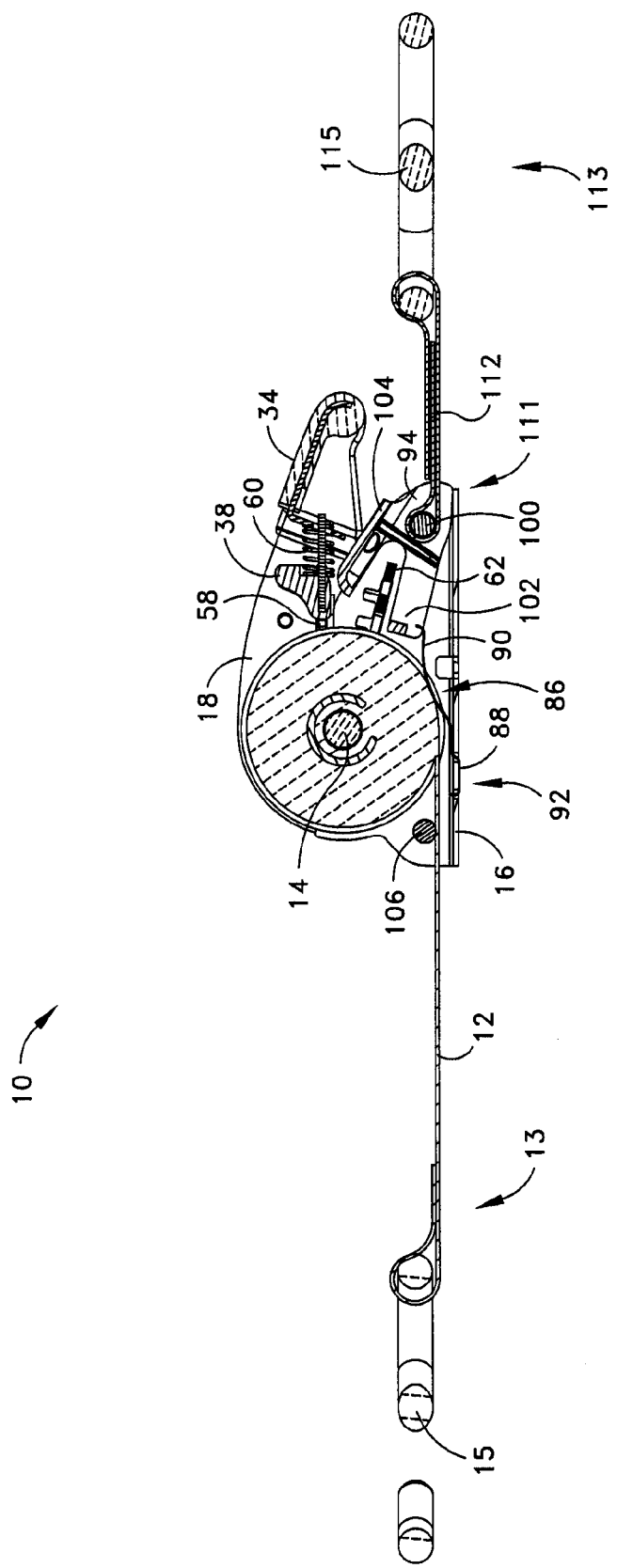
FIG. 4 is a side sectional view along line 4-4 of FIG. 3 with the webbing shown.

In cooperation with the ratchet wheels 52, 52', the tie-down device 10 can further include the rotational lock element 38. As shown in FIGS. 1, 2, and 4, the rotational lock element 38 can be retained by the lever arm 18 and can include at least one rotational lock arm 58 for engagement with at least one ratchet tooth of the plurality of ratchet teeth 54, 54'. Additionally, the rotational lock element 38 can be resiliently biased into engagement with the ratchet teeth 54, 54' by way of a biasing element, such as a spring 60 or the like, held between the lever arm 18 and the rotational lock element 38. As such, the rotational lock arms 58 can act as a pawl with respect to the ratchet teeth 54. That is, when the lever arm 18 is rotated in one direction, such as from the first position 26 to the second position 28, the rotational lock arms 58 will contact the ratchet teeth 54 and drive the rotation of the ratchet wheels 52, 52' to wind the webbing 12 about the hub 14. Correspondingly, when the lever arm 18 is rotated in the opposite direction, such as from the second position 28 to the first position 26, the resilient bias of the rotational lock element 28 will permit the rotational lock arms 58 to move past the ratchet teeth 54 without causing rotation of the ratchet wheels 52, 52'.

Thus, when it is desired to wind the webbing 12 about the hub 14 in an incremental manner, a user can utilize the means for ratcheting, including the lever arm 18, ratchet wheels 52, 52', rotational lock element 38, and/or various associated components, to drive the rotation of the hub 14. To drive the ratchet wheels 52, 52', a user can operate the lever arm 18 between the first position 26, as shown in FIG. 6A, and the second position 28, as shown in FIG. 6B, repeatedly until a desired retraction of the webbing 12 has been achieved. In this manner, a user can wind the webbing 12 about the hub 14 in a relatively slower, incremental manner to remove slack from the webbing 12 and/or to gradually apply tension to the webbing 12 for securing an object or the like.

In cooperation with the rotational lock element 38 and the ratchet wheels 52, 52', the tie-down device 10 can further include a lock member 62 that is resiliently biased into locking engagement with at least one ratchet tooth of the plurality of ratchet teeth 54, 54' to inhibit unwinding of the webbing 12 about the hub 14. The lock member 62 can be resiliently biased into locking engagement with a ratchet tooth by way of a spring or the like (not shown). For example, a spring can be disposed between the main body portion 16 and the lock member 62, though other spring locations are also contemplated. Further, the lock member 62 can include one or more lock member arms 64 for engagement with the ratchet teeth 54, 54' on each wheel 52, 52'.

Thus, the means for ratcheting can also include the lock member 62, and the lock member 62 can adjust the means for ratcheting between an operational position and a non-operational position. In the operational position, the lock member 62 is in locking engagement with at least one ratchet tooth 54, 54'. For example, similar to the rotational lock member 38, the lock member arms 64 can act as pawls with respect to the ratchet teeth 54, 54'. That is, when the lever arm 18 is rotated in one direction, such as from the second position 28 to the first position 26, the resilient bias of the lock member 62 will permit the lock member arms 64 to move past the ratchet teeth 54 without inhibiting rotation of the ratchet wheels 52, 52'. However, when the lever arm 18 is rotated in the opposite direction (e.g., from the first to the second positions 26, 28), or when the tie-down device 10 is stationary, the lock member arms 64 will contact the ratchet teeth 54 to inhibit reverse rotation of the ratchet wheels 52, 52'. Thus, when the lock member arms 64 are engaged, rotation of the ratchet wheels 52, 52', hub 14, and the like will be inhibited, or even prevented, to thereby inhibit or prevent the webbing 12 from unwinding about the hub 14. As such, because the webbing 12 is inhibited from unwinding, the lock member 62 can permit the tie-down device 10 to maintain tension within the webbing 12 when it is attached to an object or the like.

However, when it is desired to unwind the webbing 12 from the hub 14, such as when attaching it to an object or the like, the lock member 62 must be disengaged from the ratchet wheels 52, 52' (e.g., the means for ratcheting adjusted to the non-operational position). The lock member 62 can be disengaged in various manners. In one example, as shown in FIGS. 6B-6C, the lever arm 18 can further include a cam 36 for selective engagement with the lock member 62. Selective engagement of the cam 36 with the lock member 62 can permit selective adjustment of the means for ratcheting between the operational and non-operational positions. The cam 36 can be located about a peripheral edge of the lever arm 18 and can rotate together with the lever arm 18. Thus, when the lever arm 18 is rotated from the second position 28 (FIG. 6B) to the third position 30 (FIG. 6C), the cam 36 can engage a portion of the lock member 62, such as the lock member arms 64, and push the lock member 62 away from the ratchet teeth 54, 54'. As such, the lock member 62 can be thereby disengaged from the ratchet teeth 54, 54' and the means for ratcheting being in the non-operational position, to permit the webbing 12 to be unwound from the hub 14.

Figure 7A:
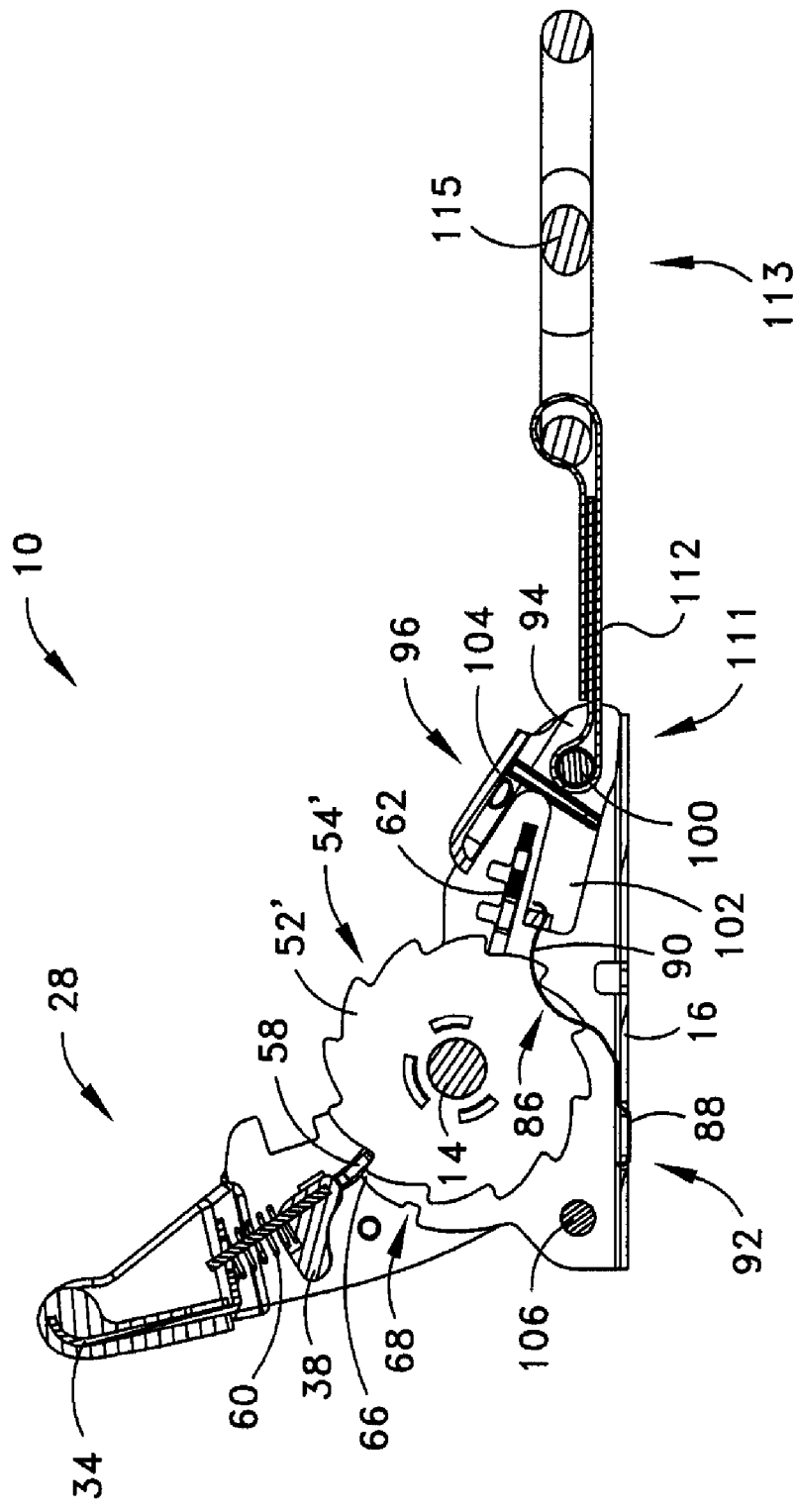
FIG. 7A is a side sectional view of the ratcheting tie-down device similar to FIG. 4, but shows an example lever arm in the example second position with a portion of the webbing not shown for clarity.
Figure 7B:
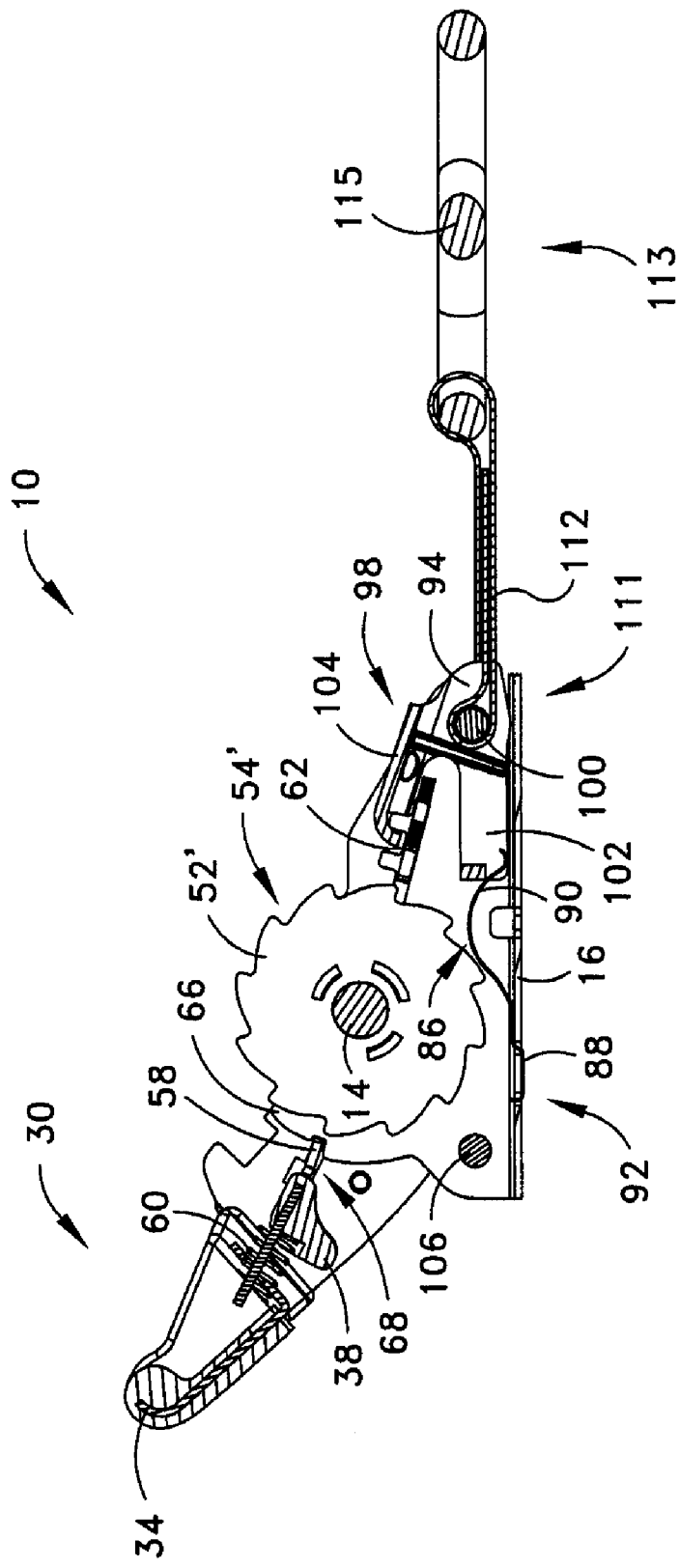
FIG. 7B is similar to FIG. 7A, but shows the lever arm in the example third position with a portion of the webbing not shown for clarity.

Because it can be undesirable for the tie-down device 10 to release the webbing 12 unexpectedly, a stop 60 or the like can be provided to inhibit the movement of the lever arm 18 from the second position 28 to the third position 30. In one example, as shown in FIGS. 7A-7B, the main body portion 16 can include the stop 66. The rotational lock element 38 attached to the lever arm 18 can also be resiliently biased into engagement with the stop 66 to thereby inhibit movement of the lever arm 18 from the second to the third position 28, 30. For example, each side of the main body portion 16 can include a stop 66 for engagement with one of the pair of rotational lock arms 58 of the rotational lock element 38. Thus, to overcome the stops 66 and move the lever arm 18 to the third position 30, a user can pull the rotational lock member 38 against the biasing force of the spring 60 to lift the rotational lock arms 58 over the stops 66.

In addition or alternatively, the tie-down device 10 can include structure to retain the lever arm 18 in the third position 30 to facilitate unwinding of the webbing 12 from the hub 14. For example, as shown, the main body portion 16 can include one or more detents 68 spaced a distance from the stops 66. Thus, after the rotational lock arms 58 are lifted over and moved beyond the stops 66 (e.g., the lever arm 18 is moved to the third position 30), the spring 60 can bias the rotational lock arms 58 towards the detents 68. Additionally, the biasing force of the spring 60 can cause the rotational lock arms 58 to be trapped within the detents 68 until removed therefrom by a user (e.g., for movement of the lever arm 18 back to either of the first or second positions 26, 28). Further, one of the sidewalls of the detents 68 can be raised sufficiently to inhibit the rotational lock arms 58 from being lifted over the sidewall to thereby inhibit the lever arm 18 from moving into a position beyond the third position 30. When the lever arm 18 is finally moved from the third position 30 back to the first or second position 26, 28, the cam 36 can be removed from engagement with the lock member 62, and the lock member 62 can automatically re-engage the ratchet wheels 52, 52'.

Figure 5:
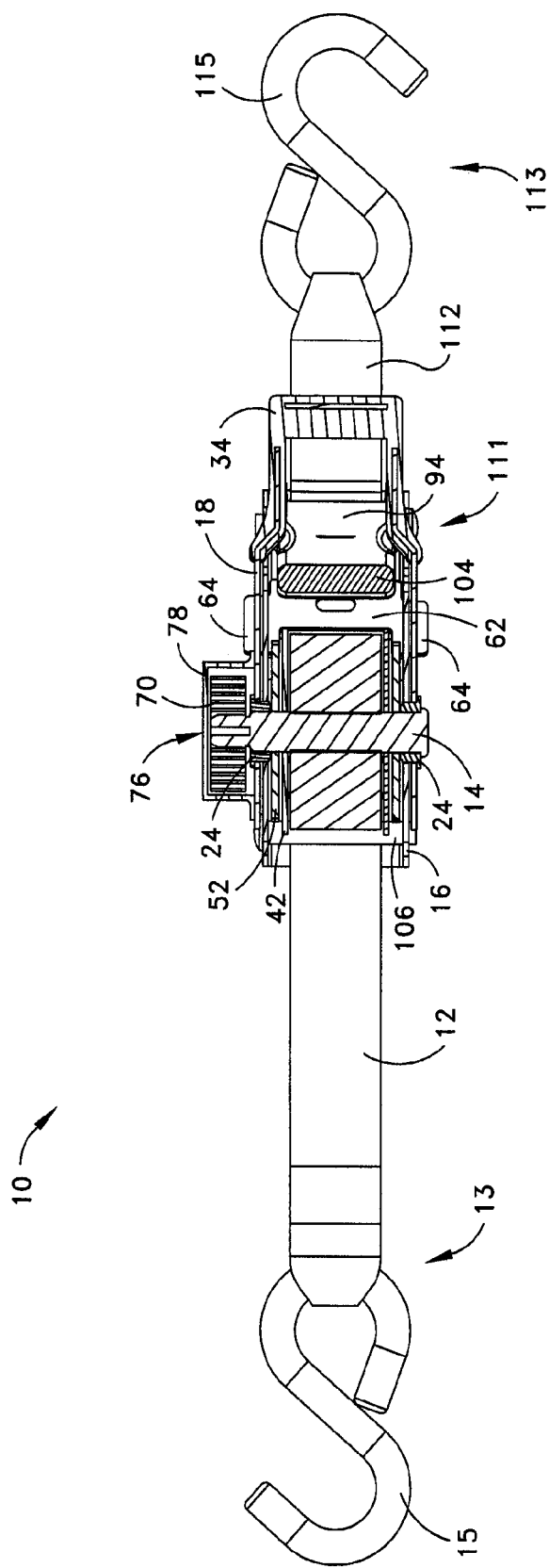
FIG. 5 is a top sectional view along line 5-5 of FIG. 3 with the webbing shown.

In addition to the aforementioned ratcheting mechanism, the tie-down device 10 can further include means for biasing 70 the reel to wind the webbing 12 onto the hub 14. The means for biasing 70 can provide a biasing force to rotate the hub 14 and thereby wind the webbing 12 thereon. In one example, the means for biasing 70 can include a spring, such as a spiral spring, coil spring, helical torsion spring, cantilevered spring, gas spring, etc., though it can also include various other resilient elements that can provide a biasing force to rotate the reel 14. In the shown example of FIGS. 2 and 5, the means for biasing 70 includes a spiral spring arranged on one side of the main body portion 16. Additionally, as shown, the spiral spring can be arranged such that it winds and unwinds about a rotational axis that is coaxial with any or all of the first, second, and third axes 20, 22, 56 discussed above. In one example, the spring extends about the axes. It is to be appreciated that more than one spring could also be used, such as a pair of spiral springs having each located on opposite sides of the main body portion 16 to provide balanced rotation of the hub 14.

The spiral spring 70 can comprise a conventional spiral spring having a metal strip coiled in a particular direction, or can even comprise a power spring having a portion of the metal strip coiled in a first direction and having another portion coiled in an opposite direction to provide additional performance characteristics, such as greater force and/or dampening features. As shown, the spiral spring 70 can also include a first end 72 and a second end 74. The first end 72 can be configured to engage complementary structure 76 of the hub 14, such as a slot or the like. Similarly, the outer end 74 can be configured to engage structure of the lever arm 18. For example, as shown, a protective cover 78 can be secured to the lever arm 18, and the outer end 74 of the spring 70 can be configured to engage complementary structure 80 of the cover 78, such as a slot or the like. However, it is to be appreciated that the inner and outer ends 72, 74 can alternatively engage the protective casing 12 and the hub 14, respectively.

Additionally, the protective cover 78 can act as a housing for the spring 70. The protective cover 78 can be attached to the lever arm 18 in various manners. In one example, the protective cover 78 can be attached by way of one or more fasteners, such as a rivet 82 or the like, though various other fasteners can also be used. Additionally, as shown, the protective cover 78 can include twist-lock structure 84 or the like for engagement with corresponding structure of the lever arm 18, such as a bayonet connection, screw connection, or the like. It is to be appreciated that the protective cover 78 can be attached to the lever arm in various other manners, such as various other fasteners, adhesives, welding, molding, and/or it can even be formed with the lever arm 18.

Thus, as the hub 14 rotates in one direction relative to the main body portion 16, the spring 70 can store potential energy, and conversely, when the hub 14 is rotated in the opposite direction, the spring 70 can release the stored potential energy. In the shown example, the biasing force of the means for biasing 70 can be configured to wind the webbing 12 about the hub 14. Thus, extension of the webbing 12 from the main body portion 16 can store potential energy in the spring 70, and retraction of the webbing 12 can release the stored energy. As such, when the lever arm 18 is in the third position 30, and the lock member 62 has been disengaged from the ratchet wheels 52, 52' to thereby permit free rotation of the hub 14, the spring 70 can automatically cause the webbing 12 to be wound about the hub 14. Accordingly, during attachment of the webbing 12 to an object or the like, any slack that may occur within the webbing 12 can be automatically reduced and/or removed by the automatic biasing force of the spring 70. Of course, the means for biasing 70 can wind the webbing 12 about the hub 14 only when the means for ratcheting is in the non-operational position. At this time it is noteworthy that maintenance of the ability of free rotation of the hub 14 is useful. As mentioned, at least one function of the bushing 24 is to maintain orientation of the hub 14. Such maintained orientation of the hub 14 thus translates into maintenance of the beneficial ability of the hub to freely rotate. Also, another benefit of the spring 70 is that the bias force can be sufficient to prevent slack in the webbing 12 while the device 10 is being applied to an object (i.e., extension of the webbing to reach the object).

It is to be appreciated that the tie-down device 10 can include various other elements, such as a braking system, dampening system (not shown), and/or a clutch (not shown). However, when a spiral spring or the like is used, the means for biasing 70 can exhibit a self-braking and/or self-dampening feature. For example, spiral springs tend to exert a relatively greater force near the maximum spring compression state, and a relatively lesser force near the minimum spring compression state. Thus, as the webbing 12 is extended from the main body portion 16 and the spring progressively stores energy, it can become increasing difficult to extend the webbing 12 the spring nears the maximum spring compression state (e.g., the webbing 12 nears a fully extended position). Thus, the transition between a partially extended and a fully extended webbing 12 can be naturally damped by the spiral spring 70. Additionally, when the webbing 12 is being wound about the hub 14 for storage, the transition between a partially wound and a fully wound webbing 12 can be damped by the progressively lessening biasing force as the spring nears a minimum compression state to inhibit a snapping motion of the webbing 12. It is to be appreciated that the various braking/dampening performance characteristics can be achieved by the aforementioned power spring.

However, in addition to any natural braking/dampening performance characteristics of the spring 70, the tie-down device can further include a separate braking system to inhibit a snapping motion of the webbing 12, hook 15 or the like, or to provide various other safety features. For example, as shown in FIGS. 2 and 4, a brake element 86 can be resiliently biased into engagement with a portion of the webbing 12 wound about the hub 14. In the shown example, the brake element 86 can include a flat spring having a base end 88 anchored to the main body portion 16, and a free end 90 for engagement with the webbing 12. The brake element 86 can include various resilient materials, such as spring steel or the like. The base end 88 can be secured to the main body portion 16 through insertion into one or more grooves or slots 92, through it can also be attached thereto by various fasteners, adhesives, welding, etc. Further, as shown, the free end 90 can include a convex, curved surface to ensure that the brake element 86 provides friction against the webbing 12 during both winding and unwinding operations.

However, it is to be appreciated that the brake element 86 may or may not act upon the webbing 12 at all times. For example, as the webbing 12 is unwound from the hub 14 and thereby decreases in diameter about the hub 14, the brake element 86 may reach an extension limit that prevents further contact with the webbing 12. In such a case, the webbing 12 can wind and unwind about the hub 14 without a braking force being supplied by the brake element 86. Once the diameter of the webbing 12 about the hub 14 is large enough to contact the free end 90, the brake element 86 will automatically act to slow, or even stop, the winding of the webbing 12 about the hub 14. Additionally, the brake element 86 can be configured to engage various other parts of the tie-down device 10, such as portions of the reel 40. For example, the free end 90 can be configured to ride upon (e.g., engage) either or both of the side elements 42, 42' or even the ratchet wheels 52, 52'. In such a case, the free end 90 could contact both the side elements 42, 42' and the webbing 12, or the free end 90 could even include additional arms or the like (not shown) adapted for engagement with the side elements 42, 42'.

The tie-down device 10 can further include a brake release member 94 for selective disengagement of the brake element 86 from the webbing 12 or other element. For example, where the brake element 86 has slowed, or even stopped, the winding of the webbing 12 about the hub 14, it can be beneficial to release the brake element 86 to permit the spring 70 to more completely wind the webbing 12 about the hub 14. As shown in FIGS. 7A-7B, the brake release member 94 can include a pivotable member that pivots about a guide pin 100. The guide pin 100 can be a pin or other generally cylindrical member secured between the sides of the main body portion 16, though it can also have various other cross-sectional geometries, such as square, rectangular, triangular, polygonal, etc. The brake release member 94 can be pivotable about the guide pin 100 between a first position 96 (FIG. 7A) and a second position 98 (FIG. 7B). Movement of the brake release member 94 from the first position 96 to the second position 98 can cause disengagement of the brake element 86 from the webbing 12 or the like. For example, as shown, a portion of the free end 90 of the brake element 86 can be engaged with, or even attached to, a lower portion 102 of the brake release member 94. Thus, when a user presses against an upper portion 104 of the brake release member 94, thereby causing it to pivot about the guide pin 100, the lower portion 102 can force the free end 90 of the brake element 86 to bend away from and disengage from the webbing 12 or other element. Because the brake element 86 is resilient, the brake release member 94 can be used to selectively vary the degree of braking applied to the webbing 12. Of course, when it is desired to re-engage the brake element 86, the user can cease to press against the upper portion 104.

As stated previously, the webbing 12 is configured to wind about the hub 14 between a fully extended position and a fully retracted position. In the fully retracted position, the webbing 12 is generally completely wound about the hub 14, though it is to be appreciated that the end 13 of the webbing 12 can extend various distances from the main body portion 16. For example, as shown in FIG. 1, the end 13 can extend a relatively large distance, though it can also extend a relatively small distance, such as where the means for attaching 15 (e.g., a hook) is in contact with the main body portion 16 or even extends within the main body portion 16. The amount of extension of the end 13 can be controlled in various manners, such as by varying the relative sizes of the reel 40 and/or the hub 14, and/or by using the brake element 86.

The ratcheting tie-down device 10 can also include various other elements. For example, as shown in FIG. 4, a guide member 106, such as a guide pin or other generally cylindrical member, can be secured between the sides of the main body portion 16. The guide member 106 can help to guide the webbing 12 relative to the main body portion 16 during both winding and unwinding of the webbing 12 about the hub 16. Although the guide member 106 is shown as a pin having a generally circular cross-sectional area, it can also have various other geometries, such as square, rectangular, triangular, polygonal, etc.

Further still, the ratcheting tie-down device 10 can also include a second webbing 112 having one end 111 being attached to the main body portion 16. The other end 113 of the second webbing 112 can be attached to a second means for attaching 115 the second webbing 112 to an object, supporting surface, or the like. For example, as shown in FIG. 4, the one end 111 of the second webbing 112 can be attached to the guide pin 100 that also serves as the pivot point for the brake release member 94, though other attachment points are also contemplated. Similar to the first means for attaching 15, the second means for attaching 115 can include a hook, strap, loop, clip, magnet, hitch, or the like. Additionally, either or both of the ends 111, 113 can be either removably or non-removably connected to the guide pin 100 and second means for attaching 115, respectively, in various manners. For example, the webbing 112 can then be folded over on itself and attached to another portion of the webbing 112 in various manners, such as by adhesives, stitching, welding, or the like. Thus, when the tie-down device 10 is in use, tension can be transmitted through the first and second webbings 12, 112, and the associated hub 14 and guide pin 100, though the tension may also be transmitted through other elements, such as the main body portion 16, ratchet wheels 54, and lock member 36, though more or less other elements are also contemplated.

Figure 8:
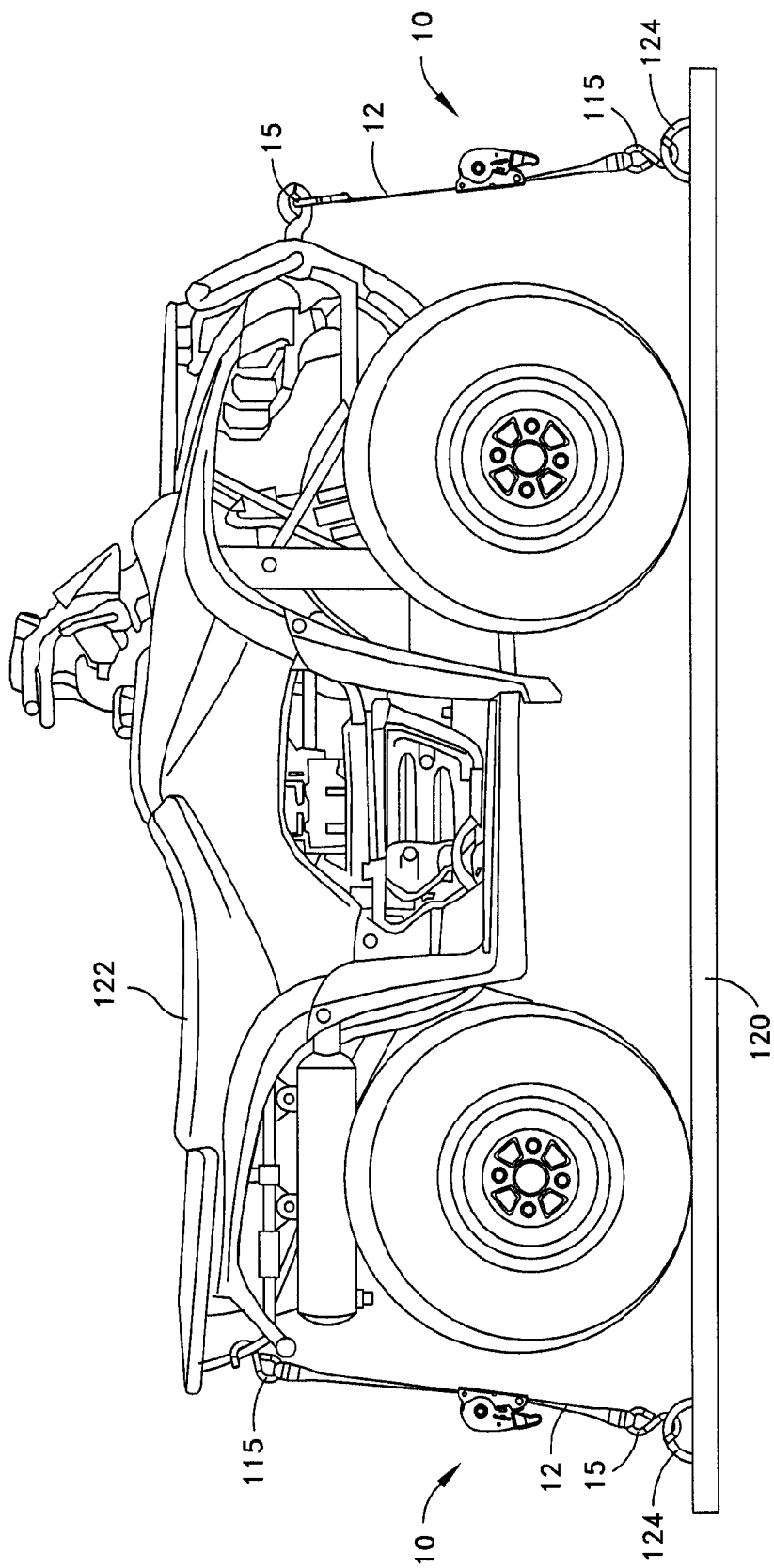
FIG. 8 is a side view of an example application for the ratcheting tie-down device of FIG. 1.

Turning to the shown example of FIG. 8, an example use for the ratcheting tie-down device 10 is illustrated schematically in accordance with an aspect of the present invention. In the shown example, the ratcheting tie-down device 10 is attached between a supporting surface 120 and a vehicle 122 to secure the vehicle 122 to the supporting surface 120. For example, the hooks 15, 115 of the tie-down devices 10 can be attached at one end to the vehicle 122, and at the other end to anchors 124 secured to the supporting surface 120. As shown, the vehicle 122 can include an all-terrain vehicle (ATV's) and the supporting surface 120 can include a trailer, truck bed, or the like, though the ratcheting tie-down device 10 can also be used with various other wheeled and non-wheeled vehicles to various other supporting surfaces. For example, the device 10 can be used with cars, trucks, boats, motorcycles, bicycles, agricultural equipment, trailers, containers, and/or the like. In addition or alternatively, the ratcheting tie-down device 10 can also be used to secure various other wheeled or non-wheeled objects, equipment, cargo, or the like to various other objects, equipment, cargo, supporting surfaces, etc. Further still, a plurality of tie-down devices 10 can be attached together in series (e.g., end-to-end attachment via the hooks) to provide a greater length tie-down for use with relatively larger objects, equipment, etc.

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

What is claimed is:

1. A ratcheting tie-down device, including:
a main body portion;
a hub rotatable relative to the main body portion;
a webbing for winding about the hub;
means for attaching at least one end of the webbing to an object;
means for biasing the hub to wind the webbing about the hub;
a lever arm rotatable relative to the main body portion, the lever arm being rotatable about a first axis and the hub being rotatable about a second axis; and
a rotational support element having a hole extending therethrough, the hub extending through the hole, the rotational support element being adapted to maintain the first axis generally coaxial with the second axis.

2. The ratcheting tie-down device of claim 1, wherein the rotational support element includes a bushing.

3. The ratcheting tie-down device of claim 2, further including a pair of bushings, each bushing having a hole extending there through, a portion of the hub extending through each of the holes of the bushings.

4. The ratcheting tie-down device of claim 1, wherein the rotational support element includes an outer peripheral edge supporting at least the main body portion and the lever arm.

5. The ratcheting tie-down device of claim 4, wherein the webbing is adapted to support a tension force along a longitudinal axis, the rotational support being adapted to transmit the tension force from the webbing to at least the main body portion and the lever arm.

6. The ratcheting tie-down device of claim 1, further including a ratchet wheel having a plurality of ratchet teeth, the ratchet wheel being rotatable relative to the main body portion about a third axis, the first, second and third axes being generally coaxial, and further including a lock member that is resiliently biased into locking engagement with at least one ratchet tooth of the plurality of ratchet teeth to inhibit unwinding of the webbing about the hub.

7. The ratcheting tie-down device of claim 1, further including means for braking adapted to inhibit the winding of the webbing about the hub.

8. The ratcheting tie-down device of claim 7, further including means for releasing adapted to selectively release the means for braking.

9. The ratcheting tie-down device of claim 1, wherein the lever arm is rotatable relative to the main body portion about the first axis, the lever arm being rotatable between a first position and a second position to cause rotation of the hub.

10. The ratcheting tie-down device of claim 9, wherein the lever arm is part of means for ratchetinq and the lever arm is rotatable to a third position to place the means for ratcheting in a non-operational condition.

11. The ratcheting tie-down device of claim 10, wherein the main body portion includes a stop and the lever arm includes a rotational lock element engagable with the stop for inhibiting rotation of the lever arm to the third position.

12. The ratcheting tie-down device of claim 10, wherein the means for ratcheting further includes a plurality of ratchet teeth rotatable about the axis and the means for ratcheting further includes a lock member that is selectively movable between locking engagement with at least one ratchet tooth of the ratchet wheel and disengagement from the ratchet wheel upon a change between the operational condition and the non-operational condition, respectively, of the means for ratcheting.

13. The ratcheting tie-down device of claim 1, wherein the means for biasing including a spiral spring having a first end and a second end, and the device further including a protective cover arranged in a covering relationship with the spiral spring, the first end of the spiral spring being attached to the hub and the second end of the spiral spring being attached to the protective cover.

14. The ratcheting tie-down device of claim 1, further including means for braking adapted to inhibit winding of the webbing about the hub for at least some amount of the webbing.

15. The ratcheting tie-down device of claim 14, wherein the means for braking includes a brake element that is resiliently biased into engagement with a portion of wound webbing.

16. The ratcheting tie-down device of claim 14, further including means for releasing engagement of the brake element from the portion of the wound webbing.

17. The ratcheting tie-down device of claim 1, further including a ratchet wheel having a plurality of ratchet teeth, the ratchet wheel being rotatable relative to the main body portion about the axis; and a lock member resiliently biased into locking engagement with at least one ratchet tooth of the plurality of ratchet teeth to inhibit unwinding of the webbing about the hub, the lever arm rotatable relative to the main body portion about the first axis between a first position and a second position to cause the ratcheting rotation of the wheel, the lever arm including a cam for engaging the lock member thereby disengaging the lock member from the at least one ratchet tool to permit unwinding of the webbing about the hub, wherein the lever arm is further rotatable between the second position and a third position, rotation of the lever arm to the third position causing the cam to engage the lock member to thereby disengage the lock member from the at least one ratchet tool to permit unwinding of the webbing about the hub.

18. The ratcheting tie-down device of claim 1, wherein the means for biasing includes a spiral spring having a first end and a second end, the spiral spring extending about the first axis and the device further including a protective cover secured to the lever arm, the first end of the spiral spring being attached to the hub and the second end of the spiral spring being attached to the protective cover.

19. The ratcheting tie-down device of claim 1, further including a brake element that is resiliently biased into engagement with at least a portion of the webbing wound about the hub.

20. The ratcheting tie-down device of claim 19, further including a brake release member movable for causing disengagement of the brake element from the webbing.

21. A ratcheting tie-down device, including:
a main body portion;
a hub that is rotatable relative to the main body portion about an axis;
a webbing for winding about the hub;
a ratchet wheel having a plurality of ratchet teeth, the ratchet wheel being rotatable with the hub;
a lock member resiliently biased into locking engagement with at least one ratchet tooth of the plurality of ratchet teeth to inhibit unwinding of the webbing about the hub;

means for attaching at least one end of the webbing to an object;

means for biasing the hub to wind the webbing about the hub;

means for braking being adapted to inhibit winding of at least some portion of the webbing onto the hub and being different from the lock member; and means for releasing being adapted to selectively release the means for braking to thereby permit the means for biasing to wind the webbing about the hub.

22. The ratcheting tie-down device of claim 21, further including a ratchet wheel being rotationally coupled to the hub and having a plurality of ratchet teeth, the ratchet wheel being rotatable relative to the main body portion about the axis, and a lock member that is resiliently biased into locking engagement with at least one ratchet tooth of the plurality of ratchet teeth to inhibit rotation of the hub, and further including a lever arm pivotally attached to the main body portion and being rotatable relative to the main body portion about the axis, the lever operatively engagable with the ratchet wheel to rotate the ratchet wheel.

23. The ratcheting tie-down device of claim 22, wherein the lever being rotatable to at least a release position whereby the lock member is disengaged from the ratchet wheel such that the hub can freely rotate, the means for biasing being adapted to automatically provide bias to wind at least a portion of the webbing about the hub when the lever arm is rotated to the release position.

24. The ratcheting tie-down device of claim 21, further including a rotational support element having a hole extending there through, the hub extending through the hole, the rotational support element being adapted to maintain the hub oriented for free rotation.

25. The ratcheting tie-down device of claim 21, wherein the means for biasing includes a spiral spring that extends about the axis.

26. The ratcheting tie-down device of claim 21, wherein the means for braking includes a brake element that is resiliently biased into engagement with a portion of the webbing wound about the hub.

27. The ratcheting tie-down device of claim 21, wherein the means for releasing further includes a brake release member movable between a first position and a second position, movement of the brake release member from the first position to the second position causing release of the means for braking.

28. A ratcheting tie-down device, including:
a main body portion;
a hub rotatable relative to the main body portion about an axis;
a webbing for winding about the hub;
means for attaching at least one end of the webbing to an object;
means for biasing the reel to wind the webbing about the hub;
a lever arm rotatable about the axis and operable to cause winding;
means for preventing webbing withdrawal;
means to disable the means for preventing such that the hub may freely rotate; and
two bushings adapted to maintain orientation of the hub such that the ability to freely rotate is maintained, with each bushing being located on the main body portion and rotationally engaging the hub at an internal bushing periphery and rotationally engaging the main body portion and the lever arm at an external bushing periphery.

* * * * *

UNITED STATES PATENT AND TRADEMARK OFFICE
CERTIFICATE OF CORRECTION

| | | |
|---|---|---|
| PATENT NO. | : 7,874,047 B2 | Page 1 of 1 |
| APPLICATION NO. | : 11/560036 | |
| DATED | : January 25, 2011 | |
| INVENTOR(S) | : Winston Breeden | |

It is certified that error appears in the above-identified patent and that said Letters Patent is hereby corrected as shown below:

Column 5, line 44, please delete "(e.g., : "")." and insert --(e.g., " ' ").--;

Column 6, line 61, please delete "(e.g., : "")." and insert --(e.g., " ' ").--;

Column 13, line 58, please delete "ratchetinq" and insert --ratcheting--;

Signed and Sealed this

Eighth Day of March, 2011

David J. Kappos
*Director of the United States Patent and Trademark Office*